UNITED STATES PATENT OFFICE.

CARL HOEPFNER, OF FRANKFORT-ON-THE-MAIN, GERMANY.

PROCESS OF PRODUCING SOLUTIONS OF ZINC CHLORID, &c.

SPECIFICATION forming part of Letters Patent No. 663,759, dated December 11, 1900.

Application filed November 18, 1897. Serial No. 658,997. (No specimens.)

*To all whom it may concern:*

Be it known that I, CARL HOEPFNER, residing at Frankfort-on-the-Main, in the German Empire, have invented certain new and useful Improvements in Processes of Producing Solutions of Zinc Chlorid and Chlorids of other Metals, (for which Letters Patent have been obtained in England, dated April 29, 1895, No. 8,449; in Germany, dated April 5, 1895, No. 87,398; patent of addition in Germany, dated June 1, 1896, No. 87,398, and in other countries, the numbers and dates of which I am at present unable to give;) and I do hereby declare the following to be a full, clear, and exact description of the invention, such as will enable others skilled in art to which it appertains to make and use the same.

This invention has for its object a simple and economical process for obtaining solutions of chlorid of zinc in a sufficiently pure state to be treated electrolytically or which may be used otherwise, and whereby valuable by-products are or can be obtained.

I will describe my invention in its relation to the production of zinc-chlorid solutions from zinc-blende or mixed blende ores or materials that contain oxid, carbonate, or sulfite of zinc. The ores containing sulfur are pulverized and roasted in order to convert the zinc salts into oxids, while the oxids, carbonates, or sulfites need no previous treatment. These oxygen compounds of zinc are then mixed with water and treated with sulfurous acid, ($SO_2$ or $H_2SO_3$,) so as to form soluble zinc bisulfites ($H_2ZnS_2O_6$) in a solid or semisolid form, but preferably in a solution which is readily separated from the residues. The free sulfurous acid contained in this solution is then neutralized or otherwise eliminated and the zinc monosulfite thereby precipitated. The zinc sulfite obtained as described is then converted into chlorid by means of a chlorid of a metal of the alkalies. To this end the sulfite is first mixed with its equivalent of chlorid of an alkali metal, together with some oxid of iron, which latter acts as a carrier or contact substance, and then subjected to the action of warm air or oxygen, the zinc chlorid resulting in accordance with the following formula:

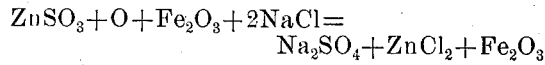

or the zinc sulfate obtained by heating the sulfite of zinc in the presence of air may be mixed with its equivalent of a suitable chlorid of an alkali metal, as sodium chlorid, which I preferably add in excess, whereby chlorid of zinc and a sulfate of the alkali-metal salt used are formed by double decomposition—

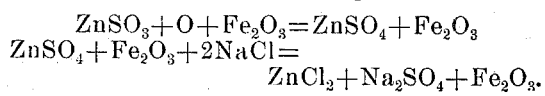

In either of these cases when a sufficient quantity of cool water is added or in lieu thereof a solution of a suitable chlorid, as one of common salt, the zinc chlorid will be leached out first, leaving the greater part of the alkali sulfate undissolved, the quantity of water or sodium-chlorid solution being of course just sufficient to take up the zinc chlorid without dissolving any considerable quantity of the alkali-metal sulfate. The solution of zinc chlorid thus obtained can now be freed from sulfurous acid, lead, cadmium, and other impurities by suitable precipitants, such as zinc or aluminium, whereby a sufficiently pure solution of zinc chlorid is obtained from which the metal can be extracted electrolytically. The residue, containing the alkali sulfate, together with some zinc chlorid, is then dissolved with water, or preferably a solution of an alkali-metal chlorid, and from this solution the alkali sulfate may be crystallized out by refrigeration, whereby any remaining zinc chlorid is obviously recovered from said solution for further use.

In this invention sulfurous-acid gases can, while yet hot, be advantageously used in the treatment of zinc-bisulfite solutions by direct contact for heating the bisulfite, causing it to give up its free acid, thereby precipitating the zinc as a monosulfite and at the same time cooling and considerably enriching the gases in sulfurous acid, which are then used for extracting zinc from a mixture of pulverized zinc ore and water.

Having thus described my invention, what

I claim as new therein, and desire to secure by Letters Patent, is—

1. The process, which consists in reacting upon an oxid or insoluble salt of zinc in presence of water with sulfurous acid to form soluble zinc bisulfite, precipitating from the bisulfite so obtained the insoluble monosulfite of zinc, and treating the latter with a chlorid of an alkali metal to form zinc chlorid, substantially as set forth.

2. The process, which consists in reacting upon an oxid or insoluble salt of zinc in presence of water with sulfurous acid to form soluble zinc bisulfite, eliminating the free acid thereby precipitating insoluble monosulfite of zinc, and treating the latter with a chlorid of an alkali metal to form zinc chlorid, substantially as set forth.

3. The process, which consists in reacting upon an oxid or insoluble salt of zinc in presence of water with sulfurous acid to form a zinc sulfite, separating the zinc-sulfite solution, mixing therewith its equivalent of sodium or potassium chlorid, exposing the mixture to hot air or oxygen, and extracting from the mixture the zinc chlorid by means of a suitable solvent so as to leave the greater part of the alkaline sulfate undissolved, substantially as set forth.

4. The process, which consists in reacting upon an oxid or insoluble salt of zinc in presence of water with sulfurous acid to form soluble zinc bisulfite, converting the bisulfite into a monosulfite by suitable reagents, mixing therewith its equivalent of sodium or potassium chlorid and exposing the mixture to heat and air in the presence of a contact substance such as oxid of iron, to convert the sulfite into a sulfate.

5. The process, which consists in reacting upon an oxid or insoluble salt of zinc in presence of water with sulfurous acid to form soluble zinc bisulfite, eliminating the free acid by suitable means, thereby precipitating the insoluble monosulfite of zinc, and treating the latter with a chlorid of an alkali metal to form zinc chlorid, substantially as set forth.

6. The process, which consists in reacting upon an oxid or insoluble salt of zinc in presence of water with sulfurous acid to form soluble zinc bisulfite, converting the bisulfite into a monosulfite by suitable reagents, mixing therewith its equivalent of sodium or potassium chlorid and exposing the mixture to heat and air in the presence of a contact substance such as oxid of iron in order to convert the monosulfite into a sulfate, separating the zinc chlorid from the solution and mixing therewith a sufficient quantity of water to dissolve the zinc chlorid and leave the alkali-metal sulfate practically undissolved, substantially as set forth.

7. The process, which consists in reacting upon an oxid or insoluble salt of zinc in presence of water with sulfurous acid to form soluble zinc bisulfite, converting the bisulfite into a monosulfite by suitable reagents, mixing therewith its equivalent of sodium or potassium chlorid and exposing the mixture to heat and air in the presence of a contact substance such as oxid of iron in order to convert the monosulfite into a sulfate, separating the zinc chlorid from the solution and mixing therewith a sufficient quantity of an aqueous solution of sodium chlorid to dissolve the zinc chlorid and leave the alkali-metal sulfate practically undissolved, substantially as set forth.

In testimony that I claim the foregoing as my invention I have signed my name in presence of two subscribing witnesses.

CARL HOEPFNER.

Witnesses:
HENRY ORTH, Jr.,
HENRY ORTH.